Figure 1:
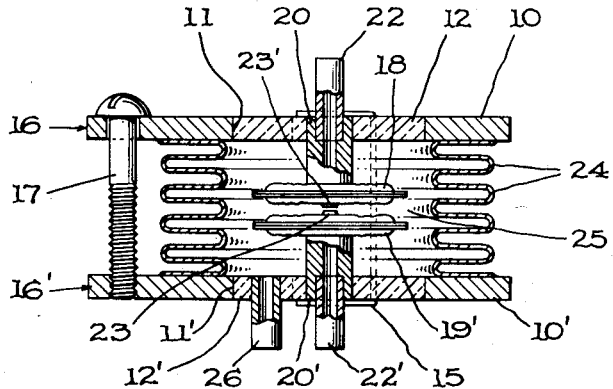

June 28, 1960  W. J. HUGHES ET AL  2,943,167
MINIATURE SEALED PRESSURE SWITCH
Filed Dec. 29, 1958

INVENTORS
WILLIAM J. HUGHES
KENNETH D. SHAUB
BY *K. G. Doub*
ATTORNEY

United States Patent Office 2,943,167
Patented June 28, 1960

2,943,167

MINIATURE SEALED PRESSURE SWITCH

William J. Hughes, Lutherville, and Kenneth D. Shaub, Timonium, Md., assignors to Bendix Aviation Corporation, Baltimore, Md., a corporation of Delaware Filed Dec. 29, 1958, Ser. No. 783,499

4 Claims. (Cl. 200—83)

This invention relates to sealed pressure switches of that type wherein mating electrical contacts are carried by opposed pressure-sensitive diaphragms mounted to supporting members conveniently adjustable both at the factory and in the field to set the contact make-or-break point at some selected altitude, see the patent to Dunmyer et al. No. 2,671,833. Switches of this type are particularly adapted for use in flight apparatus employing electrical control circuitry to be energized and/or deenergized within say plus or minus one or two millibars of pressure, while at the same time the switch must have a linear pressure-versus-altitude response characteristic and be capable of resisting vibrational and gravity forces that would otherwise affect its accuracy. Certain types of installations require switches so small and light in weight as to come within the "miniature" class. An example is a switch of approximately one inch in overall diameter, one-half inch end-to-end (height as viewed in Fig. 1) and about 25 to 30 grams in weight. Obviously the sensitivity of the switch depends upon the ability of the diaphragms to respond to exceedingly small changes in pressure. This poses a problem in constructing a miniature switch since the smaller a diaphragm is in circumference or diameter for a given cross-sectional thickness of material, the smaller is its area exposed to the pressure to be sensed and the less sensitive it becomes to variations in pressure. On the other hand, as the diameter of the diaphragm increases, the larger and heavier become the size of the associated supporting components and the overall dimensions of the switch.

In prior known sealed switches of the type shown in the Dunmyer et al. patent, the aneroid chamber in which the switch points are located is defined by a pair of opposed diaphragms, having their peripheral edges secured as by welding to a pair of adjustable supporting plates, plus a collapsible side wall in the form of a tubular bellows section attached at its opposite ends to the central portions of the plates, sealing off the capsule chamber at this point. Since only the one outer surface of each diaphragm is exposed to the pressure to be sensed, the effective areas of the respective diaphragms must of necessity be fairly large to obtain the desired sensitivity. If this type of construction were followed in building a miniature switch, the effective areas of the diaphragms would be reduced in proportion to the reduction in diameter thereof; also the aneroid chamber would become so small as to render it exceedingly difficult to properly locate the switch points therein and do the welding and other fabricating operations. Another problem is concerned with the welding of the flexible and highly sensitive diaphragms at their peripheral or marginal edges to their supporting plates, which are much thicker in cross section. This operation requires extreme care to avoid spot defects due to burning and other factors involved in resistance welding. Thus it becomes much simpler to weld the diaphragms to one another at their marginal edges since here the material is of the same thickness and interposes uniform resistance to the welding current.

An object of the present invention therefore is to construct a sealed pressure switch of the type utilizing adjustable supporting plates or analogous components in a manner such as to enable the overall switch to be made extremely small and light in weight without proportionally reducing its sensitivity to changes in pressure or altitude while at the same time maintaining its ability to withstand vibrational, gravity and other forces.

Another object is to provide a switch of the type specified which may be made in varying overall sizes and weights according to specifications without requiring the diaphragms which make up the aneroid capsules to be welded to their supporting plates or other components which might complicate the welding operation.

A further object is to provide a sealed pressure switch which may be readily adapted to break a closed electrical circuit either upon a decrease in pressure from a selected value or upon an increase in pressure from a selected value without changing the shape or arrangement of the switch contacts.

One arrangement for carrying out these objects comprises a pair of pressure-responsive capsules, each made up of a pair of diaphragms welded to one another at their marginal edges and supported in a manner such as to obtain a maximum area of surface exposed to the pressure to be sensed. These capsules are supported in opposed relation between a pair of adjustably-mounted plates or like members connected by a collapsible wall which together with said plates define a temperature-compensating chamber to be charged with a temperature-responsive fluid or gas acting on the external surfaces of the diaphragms, the electrical contacts being located in opposed relation to said chamber exteriorly of said capsules (instead of interiorly thereof) with the interior of each capsule vented to the atmosphere or other pressure to be sensed.

Figure 2:
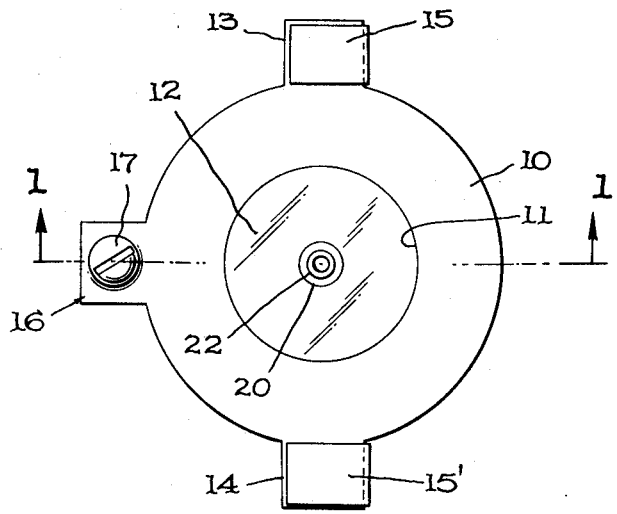

The foregoing and other objects and advantages will become apparent in view of the following description taken in conjunction with the drawing, wherein:

Fig. 1 is a view in sectional elevation of a miniature pressure switch in accordance with the invention (over twice actual size), the section being taken substantially on the line 1—1, Fig. 2; and Fig. 2 is a top plan view of the switch of Fig. 1.

A pair of supporting plates are shown at 10 and 10'; they are substantially identical in structure, each having a central opening 11, 11' therein adapted to receive an insulating disc 12, 12' formed of glass or like material capable of being bonded to the adjacent surface of the plate. A pair of spaced hinge lugs 13, 14 project radially from each plate; they are connected by hinge straps 15 and 15', which have sufficient flexibility to enable the plates to be adjusted towards and away from one another when setting the switch contacts or points in a manner to be described. Additional lugs 16, 16' accommodate an adjusting screw 17.

A pair of capsules 18, 19 are located between and centrally of the discs 12, 12'; they are made up of a pair of corrugated metallic diaphragms joined at their peripheral edges as by welding. Each capsule has secured to the central portion of its outer diaphragm a stud 20 or 20', which projects into an opening 21, formed in the center of each insulating and sealing disc 12, 12' and is bonded to the said disc at this point. Combined vent pipes and electrical terminals are indicated at 22 and 22'; at their inner ends they are fixed, as by brazing, in a relieved portion of an axial bore extending through said studs to the interior of each capsule. The inner opposed diaphragms have secured thereto switch points or contacts 23, 23'. These contacts are shown as of that type which remain closed at some given or selected pressure and open when the pressure decreases to a predetermined value. However, by utilizing the chamber 25 as the pressure-sensing chamber and evacuating the capsule chambers, the contacts 23, 23' will remain open at some selected value of pressure and close upon a predetermined decrease in pressure. To carry out this type of operation, it is only necessary to utilize the pipes or tubes 22, 22' for evacuation and the tube 26 for the pressure-sensing tube. As will be obvious, the contacts will under such circumstances be exposed to the pressure being sensed, but in the case of a decreasing atmospheric pressure, this factor becomes less serious as altitude is gained.

A flexible outer wall member in the form of a cylindrical length of corrugated bellows 24 is connected at its opposite ends to the plates 10 and 10', the said bellows in conjunction with the upper and lower plates, or the sealing and insulating disc portions of the plates, providing the temperature-compensating chamber 25, adapted to be charged with a suitable temperature-compensating fluid or gas by way of the small pipe or duct 26.

The main supporting plates 10, 10' should be made of a material having a coefficient of expansion compatible with that of the insulating material from which the discs 12, 12' are made. In practice, the plates are made of steel and the discs of glass, although these parts could be made entirely of insulating material capable of supporting the diaphragm capsules and at the same time providing an hermetic seal for the chamber 25. The studs 20, 20' may be made of any suitable material capable of being bonded to the sealing and insulating discs 12, 12' and the combined vent tubes and electrical leads 22, 22'. The diaphragms which make up the capsules are preferably comprised of a metal alloy sold under the trade name of Ni-Span C, which has desirable physical properties and is adapted for resistance welding.

A convenient method of fabrication is to first make up each plate assembly by forming the plates and insulating discs separately and then joining the discs to the metal of the plate, as by fusing, at the points of jointure. The capsules are usually formed by first attaching the studs 20, 20' and then welding the diaphragms to one another at their peripheral edges. The studs 20, 20' are then projected through the centers of the glass discs 12, 12' and fused or otherwise secured in place, being careful to seal the chamber 25 at these points. Each outer diaphragm is vented in registration with the hole in the stud. The tubes 22, 22' may be inserted in their sockets before or after assembly of the plates, as found convenient. The bellows 24 may be made or purchased as a separate unit with its opposed ends suitably contoured for engagement with and securement to the contiguous surfaces of the plates.

The chamber 25 is usually evacuated to a degree such as will leave enough residual air to provide temperature compensation. However, evacuation may proceed to an extremely low pressure and the chamber then charged with a gas or fluid having the desired temperature compensating characteristics, be it linear or non-linear. Location of the switch contacts in the chamber 25 has the well known advantage of reducing the gas ionization and electrical breakdown or arcing point. The screw 17 is shown as of the manually adjustable type, but in practice these screws are often servo-driven gear reduction systems arranged for remote control, and in numerous installations the switches are arranged in multiple or gang fashion to carry out the desired controlling functions.

Since the diaphragms which make up the capsules have all but the central portion of one diaphragm free to flex with changes in pressure, a much greater movement for a given pressure will be obtained than would be the case where only two diaphragms were used with their peripheral edges welded to the supporting plates. This is very important when the switch is miniaturized. By locating the contacts exteriorly of the capsule the fabricating and calibrating operations are materially simplified while at the same time the advantage of having the contacts in a low pressure chamber is still present.

While a preferred method of construction and the constituents of which the switch parts are made is set forth above in more or less detail, it will be understood that such is by way of example only.

What we claim is:

1. A chambered pressure switch comprising a pair of pressure-responsive capsules, spaced members supporting said capsules in a manner such as to leave substantially the entire wall area thereof free to flex in response to changes in the pressure being sensed, electrical contacts movable to circuit break and make positions by said capsules, a flexible wall member surrounding said capsules and connected at its opposite ends to said supporting members and together with the latter providing a closed chamber, and means for varying the spacing of said supporting members to thereby vary the relative spacing of said capsules independently of the pressure being sensed.

2. A pressure switch comprising a pair of opposed spaced capsule-supporting members, a flexible wall member connected at opposite ends to said supporting members and together with the latter defining a closed chamber, a pair of capsules located in opposed spaced relation in said chamber and each provided with a stem connected to its coacting supporting member, electrical contacts movable to circuit break and make positions by said capsules, means venting said capsules to the exterior of said chamber, and means for bodily adjusting said supporting members towards and away from one another to thereby set the contacts independently of the pressure being sensed.

3. A pressure switch comprising a pair of spaced supporting members, a flexible wall member connected at opposite ends to said supporting members and together with the latter providing a substantially closed chamber, a pair of capsules each made up of a pair of flexible diaphragms joined and sealed at their marginal edges, one of the diaphragms of each capsule having affixed to the central portion thereof a stem connected to the adjacent supporting member whereby the capsules are supported in opposed spaced relation in said chamber leaving substantially the entire wall area of the capsule free to flex in response to changes in the pressure being sensed, electrical contacts movable to circuit make and break positions by said capsules, means connecting said supporting members in adjustable spaced relation, and means for varying the spacing of said supporting members to thereby vary the relative spacing of said capsules independently of the pressure being sensed.

4. A pressure switch comprising a pair of spaced metallic supporting plates each having a central portion of insulating material, a flexible metallic bellows connected at its opposite ends to the central portions of said plates and together with the latter providing a substantially closed chamber, a pair of capsules each made up of a pair of flexible metallic diaphragms joined and sealed at their marginal edges, the outer diaphragm of each capsule having affixed to the central portion thereof a hollow stem which projects into an opening formed in the central insulating portion of its supporting plate and functions to vent the interior of said capsules to an external pressure, electrical contacts secured to the inner opposing diaphragms of said capsules and movable to circuit make and break positions in response to expansion and contraction of said capsules, and means connecting said plates to one another permitting selective spacing of said plates and capsules and setting of the contacts carried by the capsules.

(References on following page)

References Cited in the file of this patent

UNITED STATES PATENTS

| | | |
|---|---|---|
| 1,665,381 | Siddall et al. | Nov. 10, 1921 |
| 2,326,074 | Slepian | Aug. 3, 1943 |
| 2,671,833 | Dunmyer | Mar. 9, 1954 |
| 2,752,457 | Matthews | June 26, 1956 |
| 2,753,415 | Andresen | July 3, 1956 |
| 2,762,895 | Throw | Sept. 11, 1956 |
| 2,811,599 | Statham | Oct. 29, 1957 |
| 2,839,630 | Wood | June 17, 1958 |